(12) United States Patent  
Aggarwal et al.

(10) Patent No.: US 8,140,448 B2  
(45) Date of Patent: Mar. 20, 2012

(54) SYSTEM AND METHOD FOR CLASSIFYING DATA STREAMS WITH VERY LARGE CARDINALITY

(75) Inventors: Charu C Aggarwal, Mohegan Lake, NY (US); Philip S Yu, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 12/118,405

(22) Filed: May 9, 2008

(65) Prior Publication Data

US 2009/0281971 A1    Nov. 12, 2009

(51) Int. Cl.  
*G06F 15/18* (2006.01)

(52) U.S. Cl. .......................................................... 706/12

(58) Field of Classification Search .................. None  
See application file for complete search history.

(56) References Cited

U.S. PATENT DOCUMENTS

| | | | |
|---|---|---|---|
| 6,922,700 B1* | 7/2005 | Aggarwal et al. ................ 1/1 |
| 2008/0243742 A1* | 10/2008 | Aggarwal ........................ 706/45 |
| 2010/0027895 A1* | 2/2010 | Noguchi et al. ............... 382/224 |
| 2010/0070509 A1* | 3/2010 | Li et al. ........................... 707/747 |

OTHER PUBLICATIONS

Aggarwal C., Han J.,Wang J.,Yu P. S., On Demand Classification of Data Streams, Proc. 2004 International Conference on Knowledge Discovery and Data Mining, KDD'04,Seattle, WA, 2004.  
Aggarwal C., Data Streams, Models and Algorithms, Springer, 2007.  
Alon N., Matias Y., Szegedy M., The Space Complexity of Approximating the Frequency Moments, 1996, ACM Symposium on Theory of Computing.  
Cohen W.,Fast Effective Rule Induction, Proceedings of the ICML Conference, 1995.  
Cormode G.,Muthukrishnan S., An Improved Data-Stream Summary:The Count-min Sketch and its Applications, Journal of Algorithms, 55 (1), 2005.  
Ding Q.,Ding Q.,Perrizo W., Decision Tree Classification of Spatial Data Streams Using Peano Count Trees, Proceedings of the ACM 124 Symposium on Applied Computing, Madrid, Spain, pp. 413-417, 2002.  
Domingos P., Hulten G., Mining High Speed Data Streams, Proceedings of the Association for Computing Machinery Sixth International Conference on Knowledge Discovery and Data Mining,2000.  
Fan W., Systematic data Selection to Mine Concept Drifting Data Streams, ACM KDD Conference, pp. 128-137, 2004.

(Continued)

*Primary Examiner* — Jeffrey A Gaffin  
*Assistant Examiner* — Stanley K Hill  
(74) *Attorney, Agent, or Firm* — August Law LLC; George Willinghan

(57) ABSTRACT

An object and attributes that describe that object are identified. The attributes are grouped into attribute patterns, and classification classes are identified. For each identified class a sketch table containing a plurality of parallel hash tables is created. For the object to be classified, each attribute pattern is processed using the all of the hash functions for each sketch table, resulting in a plurality of values under each sketch table for a single attribute pattern. The lowest value is selected for each sketch table. The distribution of values across all sketch tables is evaluated for each attribute pattern, producing a discriminatory power for each attribute pattern. Attribute patterns having a discriminatory power above a given threshold are selected and added to associated sketch table values. The sketch table with the largest overall sum is identified, and the associated class is assigned to the object belonging to the attribute patterns.

25 Claims, 7 Drawing Sheets

OTHER PUBLICATIONS

Gama J., Rocha R.,Medas P.,Accurate Decision Trees for Mining High Speed Data Streams, Proceedings of the ninth International Conference on Knowledge Discovery and Data Mining.,2003.

Hulten G.,Spencer L.,Domingos P., Mining Time Changing Data Streams, ACM SIGKDD Conference, 2001.

Jin R., Agrawal G., Efficient Decision Tree Construction on Streaming Data, in Proceedings of ACM SIGKDD Conference, 2003.

Liu B.,Hsu W.,Ma Y6., Integrating Classification and Association Rule Mining in Proceedings of the ACM KDD Conference, 1998.

Rastogi R.,Shim K.,Public: A Decision Tree Classifier that Integrates Building and Pruning in Proceedings of the VLDB Conference, 1998.

Rish I.,An Empirical Study of the Naive Bayes Classifier, 2001 IJCAI Workshop on Empirical Methods in Artificial Intelligence, 2001.

Wang H., Fan W., Yu P.,Han J.,Mining Concept Drifting Data Streams Using Ensemble Classifiers, in the 9th ACM International Conference on Knowledge Discovery and Data Mining, SIGKDD, Washington, DC, 2003.

* cited by examiner

SYSTEM AND METHOD FOR CLASSIFYING DATA STREAMS WITH VERY LARGE CARDINALITY

STATEMENT REGARDING FEDERALLY SPONSORED RESEARCH

The invention disclosed herein was made with U.S. Government support under Contract No. H98230-07-C-0383 the National Security Agency. The Government has certain rights in this invention.

FIELD OF THE INVENTION

The present invention relates to data handling.

BACKGROUND OF THE INVENTION

The problem of massive-domain stream classification is one in which each attribute can take on one of a large number of possible values. Such streams often arise in applications such as internet protocol (IP) monitoring, super-store transactions and financial data. In such cases, traditional models for stream classification cannot be used, because the size of the storage required for intermediate computation of the models can increase rapidly with domain size. Furthermore, the one-pass constraint for data stream computation makes the problem even more challenging. For such cases, there are no known methods for data stream classification.

In recent years, data streams have become ubiquitous because of the new ways of collecting and processing such data. The problem of mining data streams is especially challenging because of the one-pass constraint on all mining algorithms. A number of surveys on stream mining algorithms are described in Aggarwal C., *Data Streams: Models and Algorithms*, Springer (2007). A well known problem in the data mining domain is that of classification, see, Quinlan J. R., *C4.5: Programs in Machine Learning*, Morgan-Kaufmann, Inc. (1993). In the classification problem, a labeled training data set is used in order to supervise the classification of unlabeled data instances.

The problem of massive-domain stream classification is defined as one in which each attribute takes on an extremely large number of possible values. Examples of such domains follow. In internet applications, the number of possible source and destination addresses can be very large. For example, there may be well over $10^8$ possible IP-addresses. It is impossible for most current techniques to compute the discriminatory statistics on such a large number of possible values. In fact, the storage space available on most modern desktop computers is not sufficient to explicitly compute the corresponding discriminatory statistics. For the particular case of data streams, the computation of even 1-dimensional discriminatory statistics becomes infeasible.

Many financial transactions, for example those involving credit cards, may include millions of different types depending upon the location and nature of the transaction. In such cases, the determination of patterns which indicate fraudulent activity may be infeasible from a space and computational efficiency perspective. Supermarket transactions are often drawn from millions of possibilities. In such cases, the determination of patterns that indicate different kinds of classification behavior may become infeasible from a space-efficiency and computational efficiency perspective. The computational and space-efficiency problems are not just related to the massive-domain size, but also the speed of the data stream. The problem of massive-domain size naturally occurs in the space of discrete attributes, whereas most of the known data stream classification methods are designed on the space of continuous attributes. The one-pass restrictions of data stream computation create a further challenge for the computational approach that may be used for discriminatory analysis. Thus, the massive-domain size creates challenges in terms of space-requirements, whereas the stream model further restricts the classes of algorithms that may be used in order to create space-efficient methods. This is illustrated by considering the following types of classification models.

Techniques such as decision trees require the computation of the discriminatory power of each possible attribute value in order to determine how the splits should be constructed. In order to compute the relative behavior of different attribute values, the discriminatory power of different attribute values (or combinations of values) needs to be maintained. Therefore, the space and computational efficiency to perform the intermediate computations for such splits may not be practical. Furthermore, the one-pass restriction on data stream computation makes such computation impossible.

Techniques such as rule-based classifiers require the determination of combinations of attributes which are relevant to classification. In order to determine these combinations, it is required to compute the intermediate statistics for the relevant rules. With increasing domain size, it is no longer possible to compute this efficiently either in terms of space or running time. Methods such as Bayes classifiers require the computation of probabilistic conditional estimates of class behavior over different combinations of attributes. With increasing domain size, the number of such combinations increases rapidly, and it is no longer possible to perform the computations effectively.

These implementation issues create challenges for classifiers even when the data is not presented in the form of a data stream. This is because the one-pass constraint dictates the choice of data structures and algorithms that can be used for the classification problem. All stream classifiers implicitly assume that the underlying domain size can be handled with modest main memory or storage limitations. One observation is that massive-domain data sets are often noisy, and most combinations of dimensions may not have any relationship with the true class label. While the number of possible relevant combinations may be small enough to be stored within reasonable space limitations, the intermediate computations required for determining such combinations may not be feasible from a space and time perspective. This is because the determination of the most discriminatory patterns require intermediate computation of statistics of patterns that are not relevant. When combined with the one-pass constraint of data streams, this is a very challenging problem.

SUMMARY OF THE INVENTION

Systems and methods in accordance with the present invention use sketches for effective modeling and data stream classification. A sketch-based approach is used to perform classification of data streams with massive domain-sizes. The idea is to create a sketch-based model that can approximately identify different combinations of attributes that have high discriminatory power. Such combinations are then used in order to perform the classification of a given test instance.

In accordance with one exemplary embodiment, the present invention is direct to a method for classifying objects wherein an object to be classified and a plurality of attributes associated with the identified object are identified. The plurality of attributes is group into a plurality of attribute patterns for the identified object. Each attribute pattern includes a unique set of the identified attributes. A plurality of classes to be used in classifying the object is identified, and a plurality of sketch tables is created. Each sketch table is associated with one of the identified classes. The sketch tables are used to associate a class value to each attribute pattern for each identified class and to determine a discriminating power for each attribute pattern. The attribute patterns having a discriminatory power above a given threshold are identified, and the identified attribute patterns having a discriminatory power above a pre-defined threshold are used to assign a class to the object.

In one embodiment, the object to be classified is a record in a continuous stream of data, and the plurality of classes are target activities that produce the record. In another embodiment, the object to be classified is a person, and the plurality of classes contains behaviors that can be attributed to or associated with the person. In one embodiment, the plurality of attributes includes feature variables that describe the identified object. In one embodiment, each class in the plurality of classes includes a label that describes actions associated with all members of that class. In one embodiment, each sketch table includes a plurality of hash tables.

In one embodiment, for each sketch table, a plurality of hash functions is identified. Each hash function includes an associated hash table containing a plurality of cells. A given attribute pattern is mapped to one of the plurality of cells in the hash table associated with that hash function. In order to create the plurality of sketch tables, a plurality of known objects is identified. Each known object includes a plurality of known attributes and a known class. The known class corresponds to one of the plurality of identified classes. A plurality of known attribute patterns is also identified. Each known attribute pattern corresponds to one of the plurality of attribute patterns. All of the known attribute patterns for each known object are processed through all hash functions of the sketch table corresponding to the class associated with a given known object, and table values are incremented by a value of one for cells in the hash tables obtained by processing the known attribute patterns through the hash functions. In creating the plurality of sketch tables, the table cell values are continually updated as the sketch tables are used to associate class values with attribute patterns.

In one embodiment, using the sketch tables to associate class values and to determine the discriminatory power for each attribute pattern includes, for each attribute pattern, processing that attribute pattern through each one of a plurality of hash functions for each one of the plurality of sketch tables corresponding to the plurality of identified classes. Each hash function maps the attribute pattern to one of a plurality of cells in a hash table associated with that hash function. A resultant cell for each hash function through which the attribute pattern is processed is identified, and a current cell value for each resultant cell is obtained. In addition, using the sketch tables to associate class values and to determine the discriminatory power for each attribute pattern includes, for each attribute pattern, grouping the current cell values by common sketch table and identifying a lowest current cell value for each sketch table. For each sketch table, the lowest current cell value is assigned as a class value in the class associated with that sketch table for that attribute pattern.

In one embodiment, for each attribute pattern, the discriminatory power is assigned to the attribute pattern based on the distribution of class values associated with the attribute pattern across all classes. The discriminatory power increases with an increase in the skewness of the distribution of class values. In one embodiment, using the identified attribute patterns having a discriminatory power above a pre-defined threshold includes combining common class values for all attribute patterns with discriminatory power above the given threshold to establish a total class value for each class and assigning the class having the highest total class value to the object.

DETAILED DESCRIPTION

Figure 1:
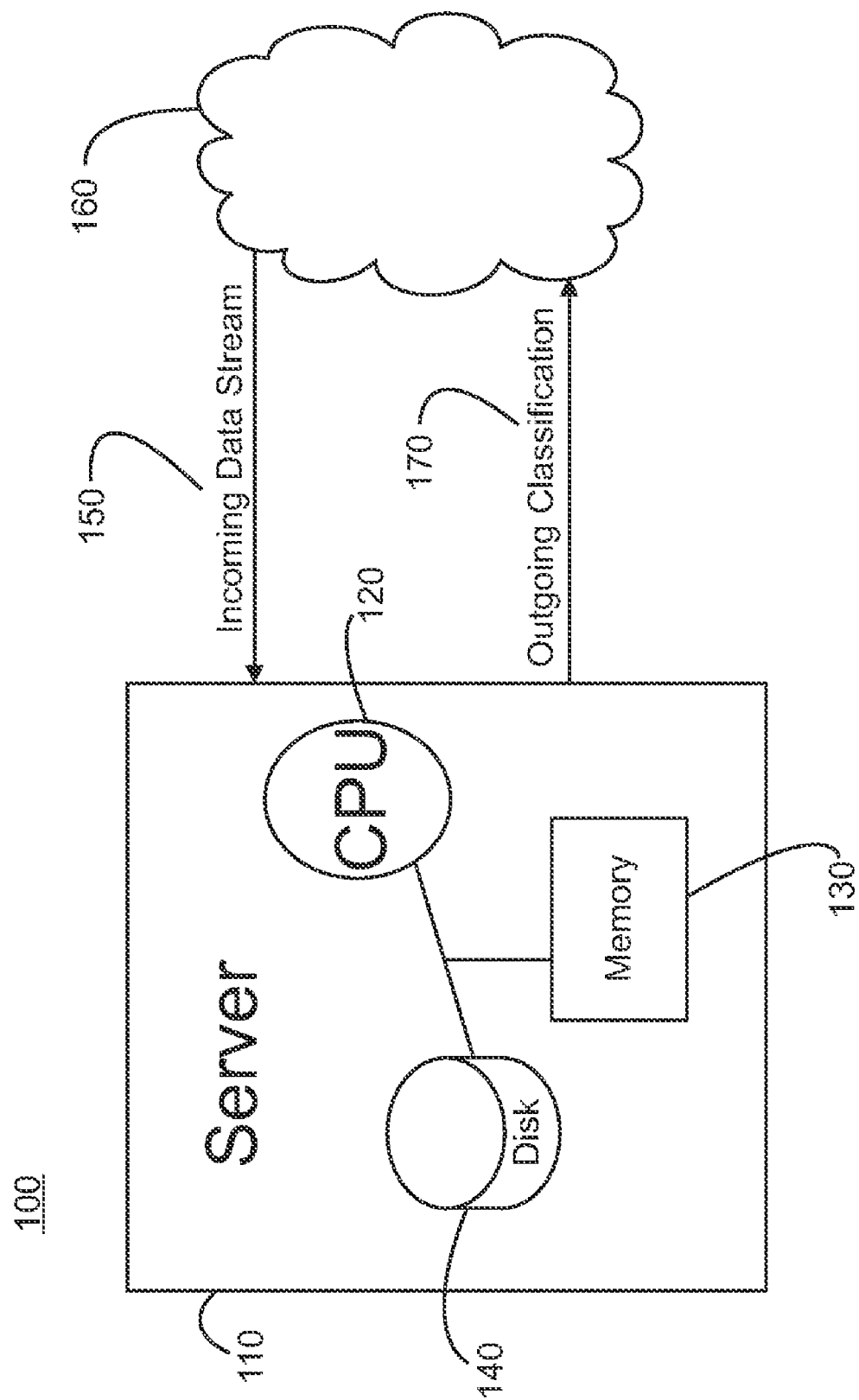
FIG. 1 is a schematic representation of an embodiment of the architecture for object classification in accordance with the present invention.

In order to described systems and methods of the present invention, notations and definitions are established. A data stream D contains d-dimensional records that are denoted by $\overline{X}_1 \ldots \overline{X}_N \ldots$ . Associated with each record is a class that is drawn from the index $\{1 \ldots k\}$. The attributes of record $\overline{X}_i$ are denoted by $(x_i^1 \ldots x_i^d)$ It is assumed that the attribute value $x_i^k$ is drawn from the unordered domain set $J_k = \{v_1^k \ldots v_{M^k}^k\}$. The value of $M^k$ denotes the domain size for the $k^{th}$ attribute. The value of $M^k$ can be very large and may range in the order of millions or billions. When the discriminatory power is defined in terms of subspaces of higher dimensionality, this number multiples rapidly to very large values. Such intermediate computations will be difficult to perform on even high-end machines.

One observation about many classification applications with massive domain sizes is the noisy relationships of the feature values, that is the values of various attributes, to the class variable. While the number of possible combinations of values are very large, only a limited number of combinations are truly relevant to the class label. Unfortunately, the intermediate computations required to effectively compare these combinations may not be easily feasible. The one-pass constraint of the data stream model creates an additional challenge in the computation process.

When the primary aim is to perform the classification process, explicit determination of the combinations of attributes that are related to a given class label. Instead, a determination is made to identify combinations of attributes that are strongly related to some class label. A sketch-based approach is used to identify these combinations of attributes. In general, sketch-based approaches enumerate different kinds of frequency statistics of data sets. A sketch is like a hash table; however, the sketch builds several hash-tables in parallel in order to reduce the underlying error. The sketch is used to compute the discriminative counts of different attribute values or patterns, i.e., combinations of attribute values. In typical subspace classifiers, for example, rule-based classifiers, low dimensional projections are used in the antecedents of the rule. These low dimensional projections include 2-dimensional or 3-dimensional combinations of attributes. In data sets having large domain sizes, the number of possible combinations of attributes, even for such low dimensional combinations, can be so large that the corresponding statistics cannot be maintained explicitly during intermediate computations. The sketch-based method of the present invention maintains counts by creating super-items from different combinations or patterns of attribute values. Each super-item V contains a concatenation of the attributes value strings along with the dimension indices to which these strings belong. In order to represent the dimension-value combinations corresponding to items $i_1 \ldots i_p$, the following values are created:

The strings $S(i_1) \ldots S(i_p)$.

The item indices $i_1 \ldots i_p$.

The super-string is then hashed into the sketch table as if it is the attribute value for the special super-item V. For each of the k-classes, a separate sketch of size w·h is maintained. This sketch is updated for a given class only when a data stream item of the corresponding class is received. The same set of w hash functions are used for updating the sketch corresponding to each of the k classes in the data. The sketch is then updated once for each 1-dimensional attribute value for the d different attributes and once for each of the super-items created by attribute combinations. For example, consider the case when of determining discriminatory combinations or 1- or 2-dimensional attributes. There are a total of $d+d\cdot(d-1)/2=d\cdot(d+1)/2$ such combinations. The sketch for the corresponding class is updated $L=d\cdot(d+1)/2$ times for each of the attribute-values or combinations of attribute-values. In general, L may be larger if even higher dimensional combinations are used. For cases of massive domain sizes, even a low-dimensional subspace would have a high enough level of specificity for classification purposes. This is because of the extremely large number of combinations of possibilities, most of which would have very little frequency with respect to the data stream. For all practical purposes, the use of 2-dimensional or 3-dimensional combinations provides sufficient discrimination in the massive-domain case. In addition, L is dependent only on the dimensionality and is independent of the domain size along any of the dimensions. For modest values of d, the value of L is typically much lower than the number of possible combinations of attribute values.

In order to implement the sketch-based classification algorithm, a separate sketch table with w·d values is maintained for each of the classes. Thus, there are a total of w·d·k cells that need to be maintained. When a new item from the data stream arrives, L·w cells are updated in the i-th sketch table. Specifically, for each item or super-item, i.e., attribute pattern, the count of the corresponding w cells in the sketch table is updated by one unit. The input to the algorithm is the data stream D, the maximum dimensionality of the subspace combinations which are tracked and the number of classes in the data set.

Effective use of the sketch-based approach of the present invention includes identifying discriminative attribute patterns, i.e., combinations of attributes. Although these combinations are not determined explicitly in closed form, a given combination of attributes is tested to determine if that combination is discriminative. Discriminative combinations are used to perform effective classification of a given test instance. For a given state of the data stream when N records have arrived, the number of data stream records received from the k different classes is denoted by $N_1 \ldots N_k$, so that the summation of different values of $N_i$ is equal to N. Most combinations of attribute values have very low frequency of presence in the data stream. However, those combinations of attribute-values having high relative presence in one class compared to the other classes are of interest. Relative presence refers to high relative presence for a given class in combination with a moderate amount of absolute presence. For example, if a particular combination of values occurs in 0.5% of the records corresponding to the class i and in less than 0.1% of the records belonging to the other classes, then the relative presence of that combination in that particular class is high enough to be considered significant.

Therefore, the discriminative power of a given combination of values (or super-item) V is defined accordingly. Let $f_i(V)$ denote the fractional presence of the super-item V in class i and $g_i(V)$ be the fractional presence of the super-item V in all classes other than i. In order to identify classification behavior specific to class i, a super-item V is desired, if $f_i(V)$ is significantly greater than $g_i(V)$. Therefore, the discriminatory power $\Theta_i(V)$ of the super-item V is defined as the fractional difference in the relative frequency of the attribute-value combination V in class i versus the relative presence in classes other than i. Formally, the value of $\Theta_i(V)$ is defined as follows:

$$\Theta_i(V) = \frac{f_i(V) - g_i(V)}{f_i(V)}$$

Since only in items from which $f_i(V)$ is greater than $g_i(V)$ are of interest, the value of $\Theta_i(V)$ in super-items of interest will lie between 0 and 1.

In order to perform the classification, all the attribute-combinations for a given test-instance are determined, and the hash table is used in order to approximate the support values of $f_i(V)$ and $g_i(V)$. These are used in order to compute the approximate values of $\Theta_i(V)$. For a given test instance, all those combinations whose discriminatory power is greater than a given threshold are determined. This threshold is user-defined. Combinations having a discriminatory power above the pre-defined threshold are then used in order to vote on the most likely class label. This class label is reported at the appropriate class label for the test instance.

Referring initially to FIG. 1, an exemplary embodiment of a data stream classification architecture 100 for use in accordance with the present invention is illustrated. The data stream classification architecture includes at least one server 110. The server 110 includes a central processing unit 120, a disk 140 or other suitable storage medium and main memory 130 such as random access memory (RAM). Suitable servers are known and available in the art. The server receives incoming data. The incoming data can be from static sources, e.g., databases, or dynamic sources, e.g., from an incoming data stream 150, which could be generated dynamically by a stream generation process. In one embodiment, the data source including the incoming data stream 150 is in communication with the server across one or more networks 160 including wide are networks and local area networks. The incoming data are then processed in the CPU. Any intermediate computations, for example, sketch table computations, are stored on the disk 140. These intermediate computations are used to perform the overall classification of objects found in the incoming data. This overall classification, which is associated with an object, is included in an outgoing data stream as an outgoing classification 170. The outgoing data stream including the object classifications can be returned to the data source from which the data were obtained. The outgoing classifications can also be delivered to a pre-determined destination such as a reporting or monitoring agency. In one embodiment, the outgoing classifications, i.e., the objects and classes, are included in the incoming data stream, and the propagation of the data stream is continued with the embedded classifications. Subsequent recipients of the data stream then have access to the classifications.

Figure 2:
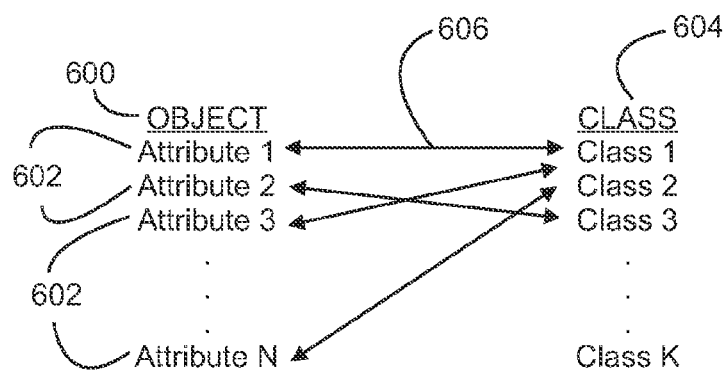
FIG. 2 is a representation showing objects, attributes and classes.

Exemplary embodiments of systems and methods in accordance with the present invention provide labels for objects encountered in the incoming data and in particular in an incoming data stream. The objects include records, e.g., data, contained within the data stream. Alternatively, the object can be the entire data stream. In addition, the objects can be the source or destination of the data or data streams, for example the host or source of an internet protocol (IP) signal, the sender of an electronic message or the recipient of the electronic message. The object can also be a person, place or thing, and the data stream contains descriptions, properties or characteristics of that person, place or thing. Referring to FIG. 2, a given object 600 includes a plurality of attributes 602. These plurality of attributes include qualities and quantities that are used to describe the object and that can be used in the identification of the object, including identifying the object individually or as part of a group. A plurality of classes 604 is also provided, and the present invention facilitates the assignments 606 of these classes or class labels to the appropriate objects.

In general, the classes are labels for the object, based on the associated object attribute, that describe an aspect of that object. This aspect is used for any number of purposes including routing in a network, security, fraud monitoring, marketing and fund raising, among others. For example, the object can be a person and the classes can be potential behaviors associated with that person including likely to donate, likely to volunteer, likely to attend and likely to purchase. The attributes for that person include demographic information. When the object is a data stream or records within the data stream, the attributes are individual data points, and the classes are target activities that are likely to produce those records, including bank fraud, tax evasion, money laundering and terrorist activity. When the objects include physically machinery, computer software or computer hardware, the attributes show operating conditions and operating states of the those objects, and the classes indicate the operating conditions or operating states of the objects, including, normal, alarm and secure, among others.

Figure 3:
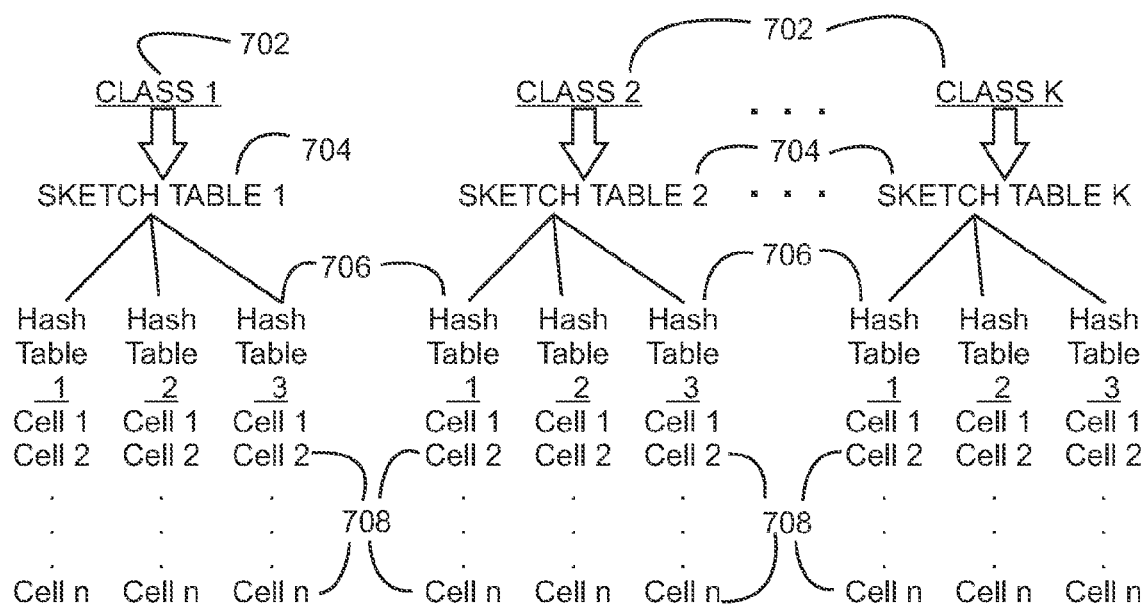
FIG. 3 is a representation of an embodiment of sketch tables for use in accordance with the present invention.

The present invention utilizes sketch tables to facilitate the association of classes to objects. Referring to FIG. 3, for a given identified plurality of classes 702, a corresponding plurality of sketch tables 704 is provided. In particular, one sketch table is provided for each class. Each sketch table included a plurality of parallel hash tables 706. Although shown as an equal number of hash tables in each sketch, the number of hash tables in each sketch can be varied. As is known in the art, each hash table uses an associated hash function to map a given input to one of a plurality of cells 708 within that hash table. In accordance with the present invention, each hash table has an associated hash function, and the hash function inputs are the attributes of the objects, either single attributes or groups of attributes called attribute patterns. Therefore, within each sketch table, a given attribute pattern can be processed by each hash function and can be mapped to a cell within each hash table.

Figure 4:
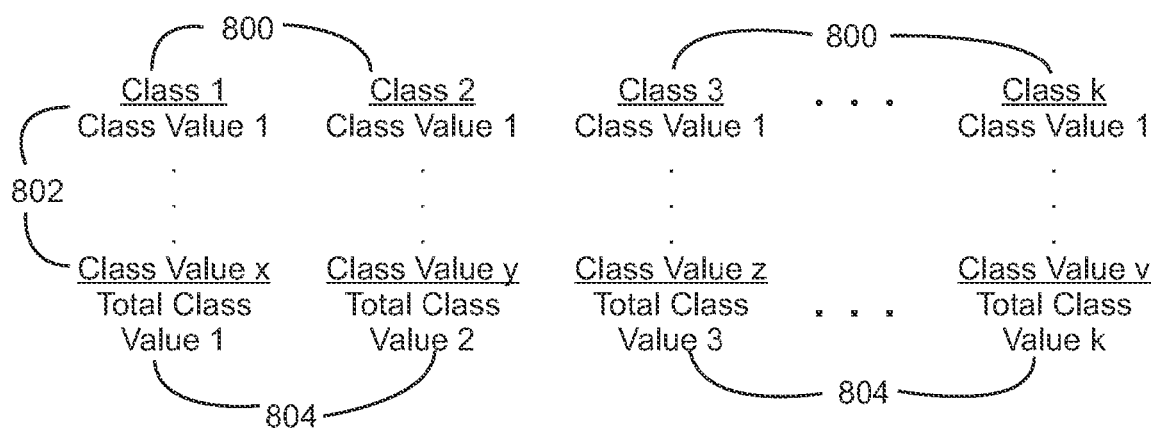
FIG. 4 is a representation showing the determination of a class using class value voting by attribute pattern.

Each cell acts as a counter or accumulator, counting the number of attribute patterns that have been mapped to that cell. In use, attribute patterns for an object to be classified are processed through each hash function for each sketch table for all of the desired classes. This will result, for each attribute pattern, in a cell value, that is the current value of the cell within a given hash table to which that attribute pattern was mapped. So each attribute pattern, for each sketch table, will include a plurality of cell values, one for each hash table. The lowest cell value in each sketch table is selected. This yields a cell table value for a given attribute pattern for each class. For example, a given attribute pattern can have a cell value pattern across four classes of 1, 3, 10, 1. Each attribute pattern for the object will have a corresponding cell value pattern across all classes. However, only a single class is desired for the object and all attribute patterns could be used to determine the proper class. Therefore, only those attribute patterns having a sufficient discriminatory power are used. The discriminatory power looks at how discriminating a given attribute pattern is. In particular, the skewness of the cell value pattern across all classes is examined. A higher skew, for example, 0, 0, 100, 0 is desired over cell patterns with little or no skew, for example, 20, 20, 22, 21. A pre-determined level of discriminatory power is selected, and only those attribute patterns having a discriminatory power above that level are chosen. As illustrated in FIG. 4, for each class 800, the cell value patterns 802 of the chosen attribute patterns are added according to class. This yields a total class value 804 for each class. The class having the highest total class value is assigned as the class of the object.

In accordance with one exemplary embodiment of the present invention, a method for classifying objects is provided that includes identifying an object to be classified along with a plurality of attributes associated with the identified object. Suitable objects include, but are not limited to continuous data streams, records within data streams, people, places and things, including machinery and computer software and computer hardware. The data streams including streaming data across computer system, computer domains, local area networks and wide area networks that are being routed among the end users and nodes within the network. The plurality of attributes includes feature variables that describe the identified object. Having identified the attributes, these attributes are grouped into a plurality of attribute patterns for the identified object. Each attribute pattern includes a unique set of the identified attributes. Each set contains one or more attributes. Preferably, the attribute patterns are selected based upon the ability of a given group of attributes to indicate membership of a given object with given group of objects or classes. For example, in making a determination about whether an individual is likely to donate to the a fund drive, a group of attributes including age, income level and past donation history are likely to indicate the current likelihood to donate. Other attribute patterns that include other attributes, for example, education level, home address and job, may enhance the accuracy of the attribute pattern in indicating class membership.

In addition to identifying the objects and attributes, a plurality of classes to be used in classifying each identified object are defined. Each class in the plurality of classes comprises a label that describes actions associated with all members of that class. Suitable classes include, but are not limited to, true, false, yes, no, likely to donate, unlikely to donate, trusted, un-trusted, secure, security level, likely to purchase, compatible, incompatible, safe and dangerous. In general, the classes are compatible with the object to be classified. In one embodiment, the object to be classified is a record in a continuous stream of data, and the plurality of classes includes target activities that produce the record. In another embodiment, the object to be classified is a person, and the plurality of classes includes behaviors that can be expected or anticipated from that person. A given class can contain more than one object, and all members of a given class will have the label associated with that class although the attributes associated with the class member objects may be different.

In order to use sketch tables in the classification of the object, a plurality of sketch tables are created. Each sketch table is associated with one of the identified classes and includes a plurality of parallel hash tables. Each hash table has an associated hash function that maps attribute patterns to cells within the associated hash table. For each sketch table, a plurality of hash functions is identified such that each hash function has an associated hash table containing a plurality of cells. Each cell acts as a counter or accumulator of all attribute patterns that have mapped to that cell. Therefore, in order to use the sketch table initially, the cells have to be populated with values. In one embodiment, the hash table cells are populated with values using known objects with known attribute patterns that have a known class association. These known objects, attribute patterns and classes are the same as the attribute patterns and classes created for classification of the identified object.

Therefore, a plurality of known objects is identified to be used in populating the cell values. Each known object includes a plurality of known attributes and a known class. The known class corresponds to one of the plurality of identified classes. The known attributes are grouped into a plurality of known attribute patterns. Each known attribute pattern corresponds to one of the plurality of attribute patterns to be used in classifying the object. All of the known attribute patterns for each known object are processed through all hash functions of the sketch table corresponding to the class associated with a given known object. This will result in the attribute patterns being mapped to cells within the hash tables, and the table values are incremented by a value of one for cells in the hash tables obtained by processing the known attribute patterns through the hash functions. In addition to initially populating the hash table cells with count values, the table cell values can be continually updated as the sketch tables are used to associate class values with attribute patterns.

The created sketch table with the populated cell values is used to associate a class value to each attribute pattern for each identified class. Thus, for a given attribute pattern, a cell value is obtained for each class. This value is one of the cell values within the sketch table for that class. For each attribute pattern, that attribute pattern is processed by each hash function and is mapped to one of the plurality of cells in the hash table associated with each hash function. In particular, that attribute pattern is processed through each one of the plurality of hash functions for each one of the plurality of sketch tables corresponding to the plurality of identified classes. Each hash function will map the attribute pattern to one of a plurality of cells in a hash table associated with that hash function. Therefore, a resultant cell for each hash function through which a given attribute pattern is processed is identified, and a current cell value is obtained for each resultant cell. This will produce a plurality of cell values from each sketch table for each attribute pattern, one cell value for each hash table in the sketch table. However, only a single value is required for a given sketch table, i.e., a single class value for each class for a given attribute pattern. In one embodiment, the single class value is identified by taking the lowest cell value for all of the cell values in a given sketch table. This will result in each attribute pattern having a plurality of class values, one value for each class, i.e., sketch table.

The attribute patterns and associated class values are used to identify the class for the object from which the attribute patterns were derived. First, however, a discriminating power is obtained for each attribute pattern. In one embodiment, the discriminatory power is assigned to the attribute pattern based on the distribution of class values associated with the attribute pattern across all classes. This discriminatory power will increase with an increase in the skewness of the distribution of class values. Having associated a discriminatory power with each attribute pattern, attribute patterns having a discriminatory power above a given threshold are identified.

These identified attribute patterns having a discriminatory power above a pre-defined threshold are used to assign a class to the object. In one embodiment, the common class values for all attribute patterns with discriminatory power above the given threshold are combined to establish a total class value for each class. The class having the highest total class value is assigned to the object. Therefore, a voting-type system, with each selected attribute pattern casting a vote is used to select the class to the object.

Figure 5:
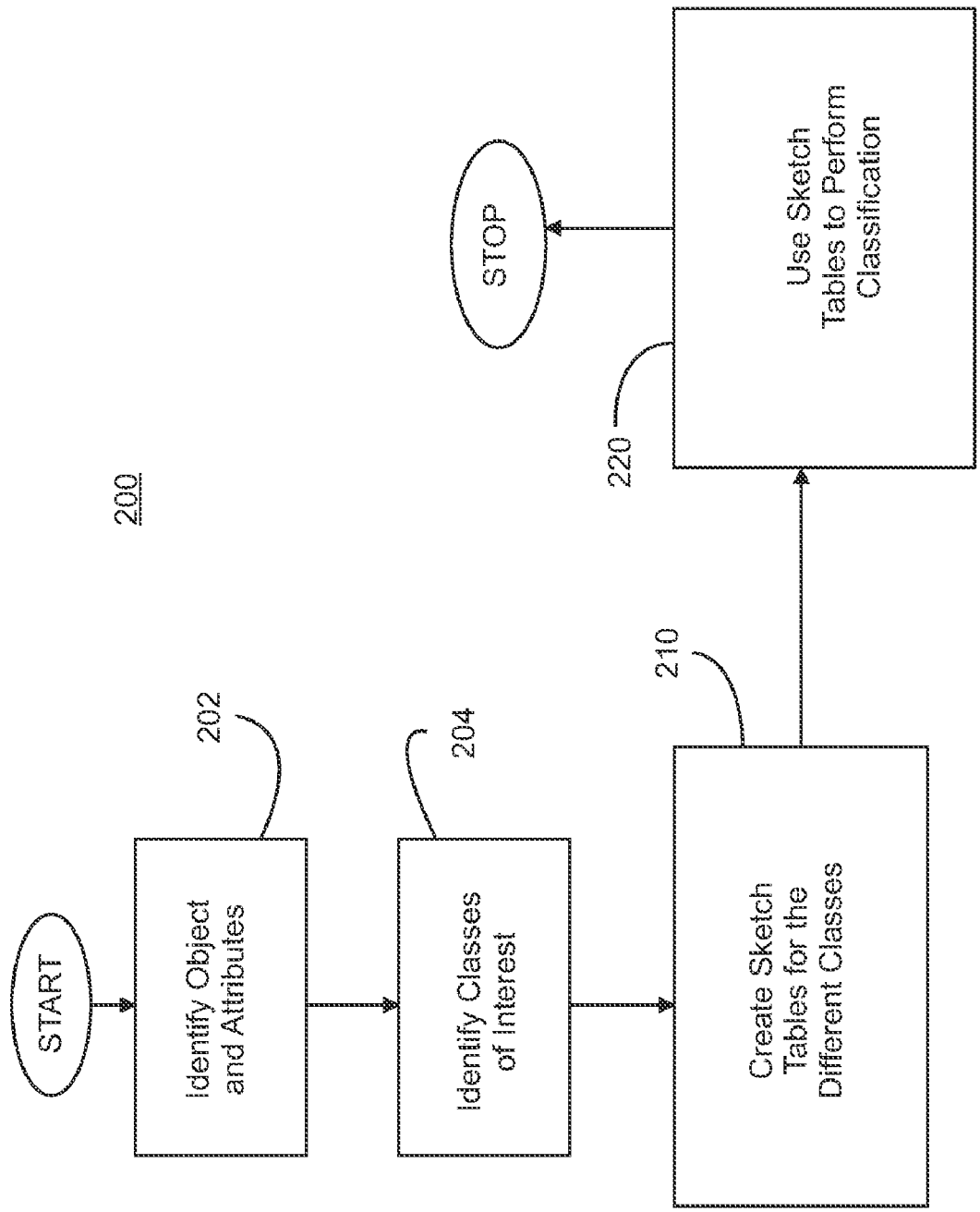
FIG. 5 is a flow chart illustrating an embodiment of the method for object classification in accordance with the present invention.
Figure 6:
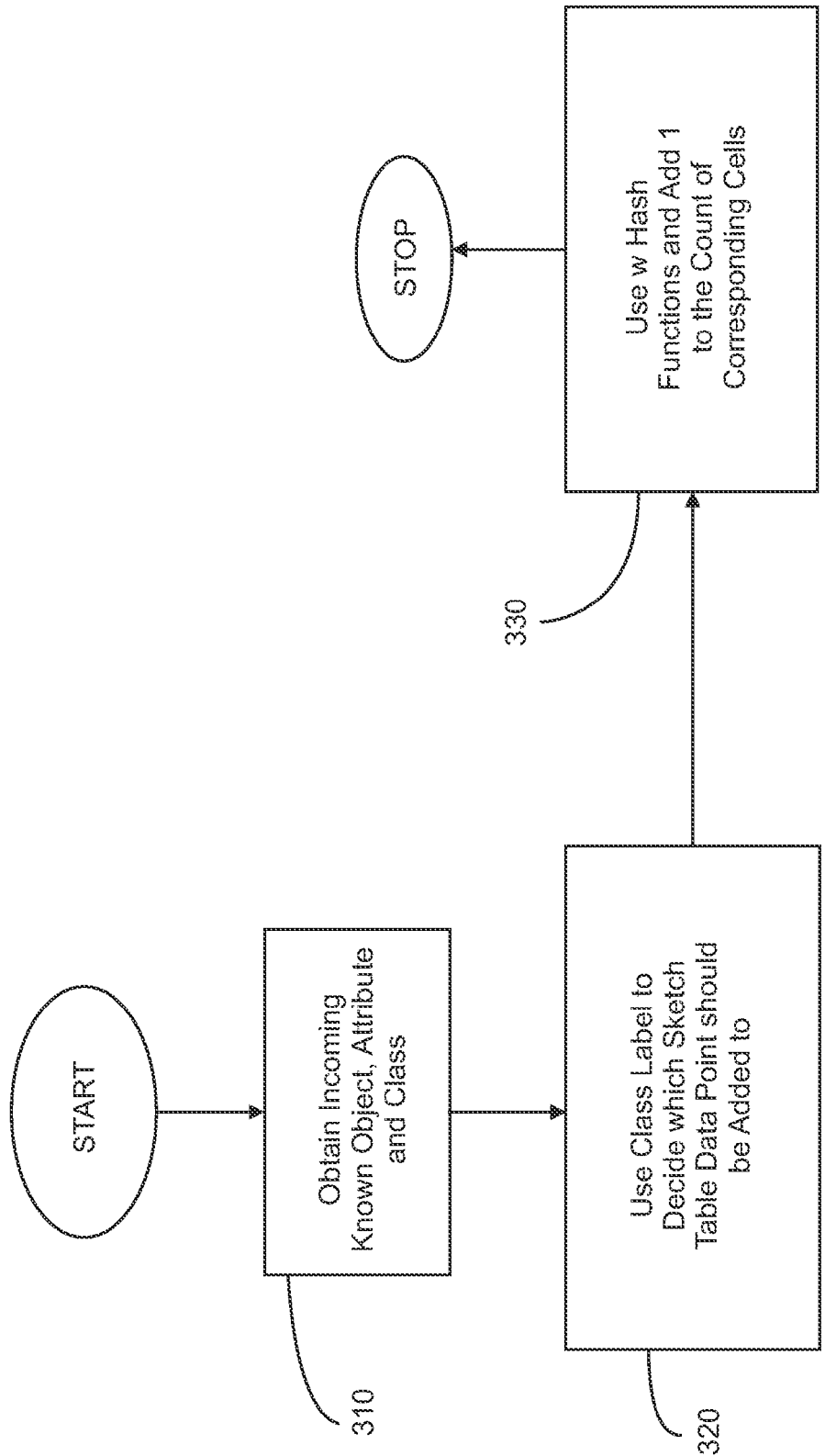
FIG. 6 is a flow chart illustrating an embodiment of the method for training a sketch table in accordance with the present invention.

Referring to FIG. 5, an embodiment of the overall object classification method 200 in accordance with the present invention is illustrated. Initially, the object to be classified and the attributes associated with that object are identified 202. In addition, the classes of interest to be used in classifying the identified object are identified 204. Since sketch tables are to be used in the classification, the sketch tables for the different classes are created 210. Each sketch table corresponds to one of the identified classes. Referring to FIG. 6, an embodiment of the creation of the sketch tables is illustrated. A plurality of known objects is obtained 310. Each known object will have a known class association and known attributes. This known object is used to train the sketch table. Based on the known class, this class is used to identify which sketch table to use to process the attribute values of the object 320. Processing of the attribute values will result in the identification of hash table cells that are then incremented 330. The count in a hash cell is typically an overestimate on the true count because of collisions between different attribute values from a given domain. The sketch tables essentially encode the classification behavior of the underlying data, since they can be used in order to determine the discriminatory power of the different patterns.

Figure 7:
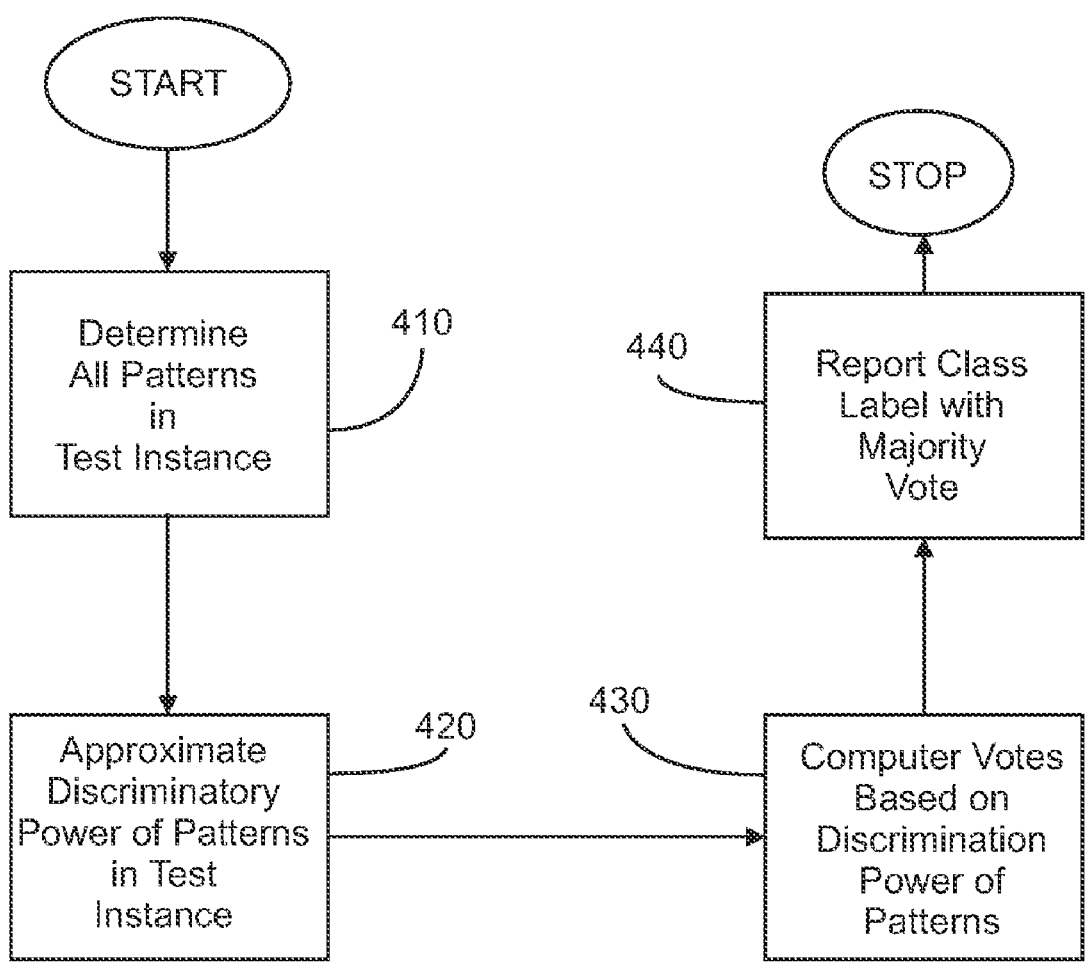
FIG. 7 is a flow chart illustrating an embodiment of the method for processing a test object in accordance with the present invention.
Figure 8:
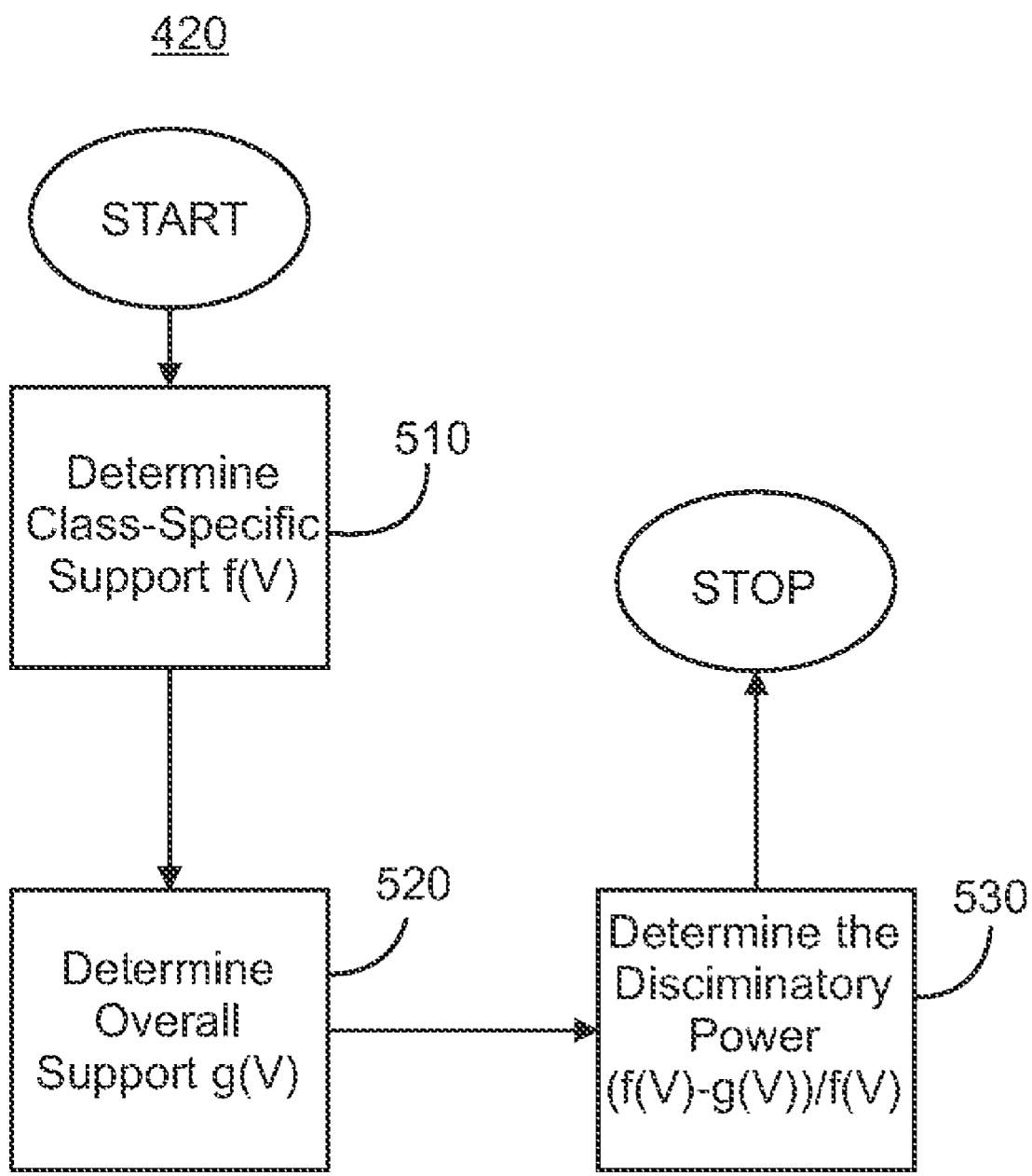
FIG. 8 is a flow chart illustrating an embodiment of the method for determining the discriminatory power of an attribute patter in accordance with the present invention.

Returning to FIG. 5, the trained sketch table is then used to perform the object classification 220. Referring to FIG. 7, an exemplary embodiment of the use of the sketch table to perform object classification is provided. An identification of all attribute patterns in a test instance of an object is determined 410. The discriminatory power of these patterns is approximated using the sketch table 420. Referring to FIG. 8, an exemplary embodiment for determining the discriminatory power of a given pattern is illustrated. In order to determine the discriminatory power of a pattern, the support f (V) with respect to the particular class, the class-specific support, is determined 510, and the support with respect to the overall data g (V) is also determined 520. The class-specific support f(V) of the pattern V is determined by hashing onto the w cells which contain the count for the super-item V. Each of these w counts is an over-estimate because of collisions. Therefore, the minimum of these values is used for the purpose of approximating the count. Next the overall count in the data is approximated 530. This is done by using the sum of the hash tables corresponding to the different classes. Then, the approximated class-specific and general counts are used in order to approximate the discriminatory power. This is computed and returned.

Returning to FIG. 7, only those patterns having a discriminatory power above a certain threshold are used for the classification process. These patterns are then used in order to determine the votes for different classes 430. Once the votes for the different classes have been determined, the class with the majority vote is identified 440. This is returned as the most relevant class.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for classifying objects in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for classifying objects, the method comprising:
    identifying an object to be classified and a plurality of attributes associated with the identified object;
    grouping the plurality of attributes into a plurality of attribute patterns for the identified object, each attribute pattern comprising a unique set of the identified attributes;
    identifying a plurality of classes to be used in classifying the object;
    creating a plurality of sketch tables, each sketch table comprises at least one hash table and is associated with one of the identified classes;
    using the sketch tables to associate a class value to each attribute pattern for each identified class and to determine a discriminating power for each attribute pattern;
    identifying attribute patterns having a discriminatory power above a given threshold; and
    using the identified attribute patterns having a discriminatory power above a pre-defined threshold to assign a class to the object.

2. The method of claim 1, wherein the object to be classified comprises a record in a continuous stream of data and the plurality of classes comprise target activities that produce the record.

3. The method of claim 1, wherein the object to be classified comprises a person and the plurality of classes comprise behaviors.

4. The method of claim l, wherein the plurality of attributes comprises feature variables that describe the identified object.

5. The method of claim 1, wherein each class in the plurality of classes comprises a label that describes actions associated with all members of that class.

6. The method of claim 1, wherein each sketch table comprises a plurality of hash tables.

7. The method of claim 1, wherein the step of creating the plurality of sketch tables further comprises, for each sketch table:
    identifying a plurality of hash functions, each hash function having an associated hash table comprising a plurality of cells; and
    mapping a given attribute pattern to one of the plurality of cells in the hash table associated with that hash function.

8. The method of claim 7, wherein the step of creating the plurality of sketch tables further comprises:

identifying a plurality of known objects, each known object comprising a plurality of known attributes and a known class, the known class corresponding to one of the plurality of identified classes;

identifying a plurality of known attribute patterns, each known attribute pattern corresponding to one of the plurality of attribute patterns;

processing all of the known attribute patterns for each known object through all hash functions of the sketch table corresponding to the class associated with a given known object; and incrementing table values by a value of one for cells in the hash tables obtained by processing the known attribute patterns through the hash functions.

9. The method of claim 8, wherein the step of creating the plurality of sketch tables further comprises continually updating the table values as the sketch tables are used to associate class values with attribute patterns.

10. The method of claim 1, wherein the step of using the sketch tables to associate class values and to determine the discriminatory power for each attribute pattern further comprises, for each attribute pattern:

processing that attribute pattern through each one of a plurality of hash functions for each one of the plurality of sketch tables corresponding to the plurality of identified classes, each hash function mapping the attribute pattern to one of a plurality of cells in a hash table associated with that hash function;

identifying a resultant cell for each hash function through which the attribute pattern is processed; and obtaining a current cell value for each resultant cell.

11. The method of claim 10, wherein the step of using the sketch tables to associate class values and to determine the discriminatory power for each attribute pattern further comprises, for each attribute pattern:

grouping the current cell values by common sketch table;

identifying a lowest current cell value for each sketch table; and assigning, for each sketch table, the lowest current cell value as a class value in the class associated with that sketch table for that attribute pattern.

12. The method of claim 11, further comprising, for each attribute pattern, assigning the discriminatory power to the attribute pattern based on the distribution of class values associated with the attribute pattern across all classes.

13. The method of claim 12, wherein the discriminatory power increases with an increase in the skewness of the distribution of class values.

14. The method of claim 1, wherein the step of using the identified attribute patterns having a discriminatory power above a pre-defined threshold further comprises:

combining common class values for all attribute patterns with discriminatory power above the given threshold to establish a total class value for each class; and assigning the class having the highest total class value to the object.

15. A non-transitory computer-readable medium containing a computer-readable code that when read by a computer causes the computer to perform a method for classifying objects, the method comprising:

identifying an object to be classified and a plurality of attributes associated with the identified object;

grouping the plurality of attributes into a plurality of attribute patterns for the identified object, each attribute pattern comprising a unique set of the identified attributes;

identifying a plurality of classes to be used in classifying the object;

creating a plurality of sketch tables, each sketch table comprises at least one hash table and is associated with one of the identified classes;

using the sketch tables to associate a class value to each attribute pattern for each identified class and to determine a discriminating power for each attribute pattern;

identifying attribute patterns having a discriminatory power above a given threshold; and using the identified attribute patterns having a discriminatory power above a pre-defined threshold to assign a class to the object.

16. The non-transitory computer-readable medium of claim 15, wherein the step of creating the plurality of sketch tables further comprises, for each sketch table:

identifying a plurality of hash functions, each hash function having an associated hash table comprising a plurality of cells; and mapping a given attribute pattern to one of the plurality of cells in the hash table associated with that hash function.

17. The non-transitory computer-readable medium of claim 16, wherein the step of creating the plurality of sketch tables further comprises:

identifying a plurality of known objects, each known object comprising a plurality of known attributes and a known class, the known class corresponding to one of the plurality of identified classes;

identifying a plurality of known attribute patterns, each know attribute pattern corresponding to one of the plurality of attribute patterns;

processing all of the known attribute patterns for each known object through all hash functions of the sketch table corresponding to the class associated with a given known object; and incrementing table values by a value of one for cells in the hash tables obtained by processing the known attribute patterns through the hash functions.

18. The non-transitory computer-readable medium of claim 17, wherein the step of creating the plurality of sketch tables further comprises continually updating the table values as the sketch tables are used to associate class values with attribute patterns.

19. The non-transitory computer-readable medium of claim 15, wherein the step of using the sketch tables to associate class values and to determine the discriminatory power for each attribute pattern further comprises, for each attribute pattern:

processing that attribute pattern through each one of a plurality of hash functions for each one of the plurality of sketch tables corresponding to the plurality of identified classes, each hash function mapping the attribute pattern to one of a plurality of cells in a hash table associated with that hash function;

identifying a resultant cell for each hash function through which the attribute pattern is processed; and obtaining a current cell value for each resultant cell.

20. The non-transitory computer-readable medium of claim 19, wherein the step of using the sketch tables to associate class values and to determine the discriminatory power for each attribute pattern further comprises, for each attribute pattern:

grouping the current cell values by common sketch table;

identifying a lowest current cell value for each sketch table; and assigning, for each sketch table, the lowest current cell value as a class value for that attribute pattern in the class associated with that sketch table.

21. The non-transitory computer-readable medium of claim 20, wherein the method further comprises, for each attribute pattern:
    assigning the discriminatory power to the attribute pattern based on the distribution of class values associated with the attribute pattern across all classes.

22. The non-transitory computer-readable medium of claim 21, wherein the discriminatory power increases with an increase in the skewness of the distribution of class values.

23. A method for classifying data streams, the method comprising:
    identifying records in an incoming data stream to be classified and a plurality of attributes associated with each record;
    grouping the plurality of attributes into a plurality of attribute patterns for each record, each attribute pattern comprising a unique set of the identified attributes;
    identifying a plurality of classes to be used in classifying the records, each class comprising a label describing a target activity that produced all records in that class;
    creating a plurality of sketch tables, each sketch table comprising a plurality of hash tables and associated with one of the identified classes;
    using the sketch tables to associate a class value to each attribute pattern of each record for each identified class and to determine a discriminating power for each attribute pattern of each record;
    identifying attribute patterns in each record having a discriminatory power above a given threshold;
    combining common class values for all attribute patterns in a given record with discriminatory power above the given threshold to establish a total class value for each class for the given record; and
    assigning the class having the highest total class value to the given record.

24. The method of claim 23, wherein the step of using the sketch tables to associate class values and to determine the discriminatory power for each attribute pattern further comprises, for each attribute pattern:
    processing that attribute pattern through each one of a plurality of hash functions for each one of the plurality of sketch tables corresponding to the plurality of identified classes, each hash function mapping the attribute pattern to one of a plurality of cells in a hash table associated with that hash function;
    identifying a resultant cell for each hash function through which the attribute pattern is processed;
    obtaining a current cell value for each resultant cell;
    grouping the current cell values by common sketch table;
    identifying a lowest current cell value for each sketch table; and
    assigning, for each sketch table, the lowest current cell value as a class value for that attribute pattern in the class associated with that sketch table.

25. The method of claim 24, wherein the method further comprises, for each attribute pattern:
    assigning the discriminatory power to the attribute pattern based on the distribution of class values associated with the attribute pattern across all classes.

* * * * *